United States Patent
Kim et al.

(10) Patent No.: US 11,783,728 B1
(45) Date of Patent: Oct. 10, 2023

(54) EXPERT NAVIGATION DEVICE BASED ON ACTUAL WELDING DATA

(71) Applicant: TOTAL SOFT BANK LTD., Busan (KR)

(72) Inventors: Maeng Nam Kim, Busan (KR); Min Jung Kwon, Daegu (KR); Sang Ho Shin, Yangsan-si (KR)

(73) Assignee: TOTAL SOFT BANK LTD., Busan (KR)

( * ) Notice: Subject to any disclaimer, the term of this patent is extended or adjusted under 35 U.S.C. 154(b) by 0 days.

(21) Appl. No.: 18/097,474

(22) Filed: Jan. 16, 2023

(30) Foreign Application Priority Data

Dec. 29, 2022 (KR) .................. 10-2022-0189761

(51) Int. Cl.
G09B 19/24 (2006.01)
B23K 9/095 (2006.01)
G09B 5/02 (2006.01)

(52) U.S. Cl.
CPC .............. *G09B 19/24* (2013.01); *B23K 9/095* (2013.01); *B23K 9/0953* (2013.01); *B23K 9/0956* (2013.01); *G09B 5/02* (2013.01)

(58) Field of Classification Search
CPC ........ G09B 19/00; G09B 19/24; B23K 9/095; B23K 9/0956; B23K 9/0953
See application file for complete search history.

(56) References Cited

U.S. PATENT DOCUMENTS

| 5,514,851 A | * | 5/1996 | Siewert | B23K 9/0956 |
| | | | | 219/130.21 |
| 2016/0267806 A1 | * | 9/2016 | Hsu | G09B 19/24 |
| 2021/0405620 A1 | * | 12/2021 | Ivkovich | G06N 20/00 |
| 2022/0258268 A1 | * | 8/2022 | Becker | B23K 9/0956 |

FOREIGN PATENT DOCUMENTS

KR 20200009687 * 1/2020 .............. B23K 9/16

* cited by examiner

*Primary Examiner* — Robert J Utama
(74) *Attorney, Agent, or Firm* — Revolution IP, PLLC (57) ABSTRACT

An expert navigation device based on actual welding data of an embodiment includes: a welding variable acquisition unit that acquires welding variable data of an expert through a bigdata platform; a welding line extraction unit that analyzes a base material, which is a welding target, through a camera mounted on a welding helmet to acquire the welding line in the base material; a synchronization unit that generates a trigger, which serves as a reference point, for matching the welding variable data acquired through the welding variable acquisition unit to the welding line acquired through the welding line extraction unit; and a navigation output unit that displays information of the welding variable data to a user when a welding location reaches a trigger point while welding is performed based on the trigger point generated by the synchronization unit.

4 Claims, 6 Drawing Sheets

EXPERT NAVIGATION DEVICE BASED ON ACTUAL WELDING DATA

BACKGROUND OF THE INVENTION

1. Field of the Invention

The present invention relates to a device that provides a beginner welder with welding data based on welding variables collected when an expert performs welding, and more specifically, to a device that provides a beginner welder with a work angle, a travel angle, an arc length, a speed, etc., which are changed in a specific section, by using expert welding data.

2. Description of the Related Art

A welding posture includes a flat posture, a horizontal/vertical posture, an overhead posture, etc. The flat posture refers to a posture for welding a base material serving as a welding target while looking down the base material, and is used to weld a joint having an appropriately horizontal welding line from the top. The horizontal posture refers to a posture for welding a joint having a substantially horizontal welding line from the longitudinal direction. In addition, the vertical posture refers to a posture for welding a surface perpendicular to a horizontal surface of a welding worktable or a surface having an angle of 60° or greater with respect to the horizontal surface of the welding worktable. Finally, the overhead posture refers to a posture for welding a target while looking up from the bottom.

When one welding posture is used, high-quality results can be obtained by performing constant welding without a change in the work angle, travel angle, speed, and arc length of the welding. However, when base materials having a bent or curved welding line are used, such as pipes, the welding postures need to be changed according to a shape of base materials, and the work angle, the travel angle, the speed, and the arc length are differently set, so that it may be difficult for a beginner welder to perform welding.

The beginner welder has a lot of difficulties in welding when the base material has a complex shape. Even if the welding is performed while maintaining the constant angle, speed, and arc length of the torch, variables need to be changed according to a change in the shape of base materials. In this case, when the welding is not properly performed, an arc goes out or defects occurs due to the arc length or speed.

SUMMARY OF THE INVENTION

In the present invention, when an expert performs welding, a real-time welding variable collection device acquires behavioral welding variables of the expert by tracking welding behavior of the expert. That is, an IMU sensor installed in a welding torch of the expert extracts data about a work angle and travel angle of welding performed by the expert, which are tracked when the expert performs welding.

In addition, a welding image is acquired using a camera of a welding helmet worn by a user, and a welding speed and a contact tip to work piece distance (CTWD) are acquired by extracting arc light and a contact tip from the acquired image. Such information (welding speed and CTWD) is recorded for each frame of the acquired image, and when the welding is finished, information acquired over time is listed to provide the information to a trainee.

Therefore, the present invention can measure behavioral variables (work angle, travel angle, speed, and arc length) of the current welder while performing welding in real-time. Behavioral variable information about welding may be collected when the expert performs welding, and such information is useful for beginner welders.

For example, when the beginner welder performs welding, welding may be guided by visualizing in real-time the behavioral variable information of the expert on an AR device, thereby improving a welding quality using the behavioral variable information of the expert.

DETAILED DESCRIPTION OF THE INVENTION

The present invention allows a beginner to refer to welding skills of an expert for welding training by using data acquired through a welding variable collection device.

That is, an image of a base material, which is a welding target, is acquired by a camera attached to a welding helmet. In addition, after the acquired image is analyzed to track a welding line to be welded, expert welding variable data (or behavioral variable information) is synchronized based on the welding line. When a welder performs welding, the welding variable data synchronized to the welding line is provided to the beginner, such that the beginner can also improve a welding quality using the welding skills of the expert.

Figure 1:
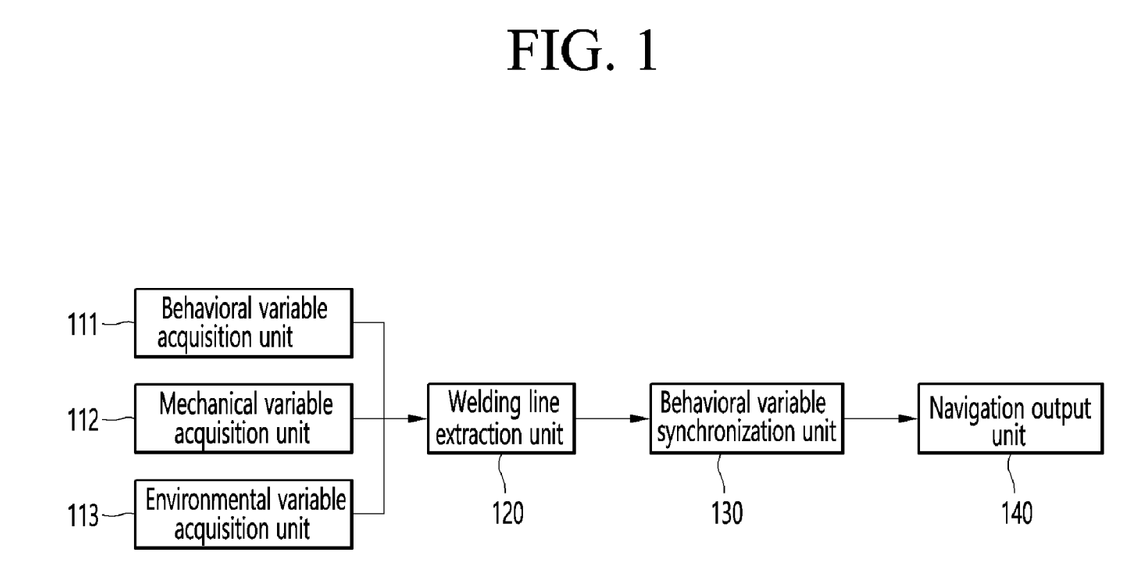
FIG. 1 is a diagram showing a configuration of an expert navigation device based on actual welding data of the present invention.

FIG. 1 is a diagram showing a configuration of an expert navigation device based on actual welding data of the present invention.

Referring to FIG. 1, an expert navigation device based on actual welding data of the present invention includes: a behavioral variable acquisition unit 111 that acquires behavioral welding variables indicating information of actual welding performed by the expert under the same condition as a welding condition that the welder needs to be performed; a welding line extraction unit 120 that extracts a welding line of a base material, which is a welding target, through a camera attached to a welding helmet; a synchronization unit 130 that matches behavioral variable information to a point where a welding posture is changed based on the data acquired through the behavioral variable acquisition unit and the welding line extraction unit; and a navigation output unit 140 that visualizes the behavioral variables to the welder through the synchronization unit 130.

The behavioral variable acquisition unit 111 may collect a work angle and a travel angle with a base material, a welding speed, and a CTWD when the expert actually performs welding, and may also collect mechanical variables and environmental variables.

The device of the present embodiment may further include a mechanical variable acquisition unit 112 together with the behavioral variable acquisition unit 111, and the mechanical variable acquisition unit 112 may collect a voltage, a current, and a wire feeding speed when the expert performs welding.

In addition, the device of the present embodiment may further include an environmental variable acquisition unit 113 together with the behavioral variable acquisition unit 111, and the environmental variable acquisition unit 113 may collect a temperature, a humidity, a wind direction, and a wind speed using a sensor installed in a welding workplace.

All the behavioral variable acquisition unit 111, the mechanical variable acquisition unit 112, and the environmental variable acquisition unit 113 may referred to as welding variable acquisition units.

In the following description, the welding variable acquisition unit may be interpreted as a term including any one or more of these acquisition units.

That is, the welding variable acquisition unit serves to store welding variable data collected when the expert performs welding in a bigdata platform and acquire the welding variable data stored in the bigdata platform by a user even when the user accesses the bigdata platform to retrieve the welding variable data.

Meanwhile, the welding line extraction unit 120 serves to acquire a welding line in the base material by analyzing the base material, which is a welding target, through a camera mounted on a helmet worn by the user.

In addition, the synchronization unit 130 serves to generate a trigger, which serves as a reference point, for matching the welding variable data acquired through the welding variable acquisition unit to the welding line acquired through the welding line extraction unit 120.

In addition, the navigation output unit 140 displays information of the welding variable data to the user when a welding location reaches a trigger point while welding is performed based on the trigger point generated by the synchronization unit 130.

Figure 2:
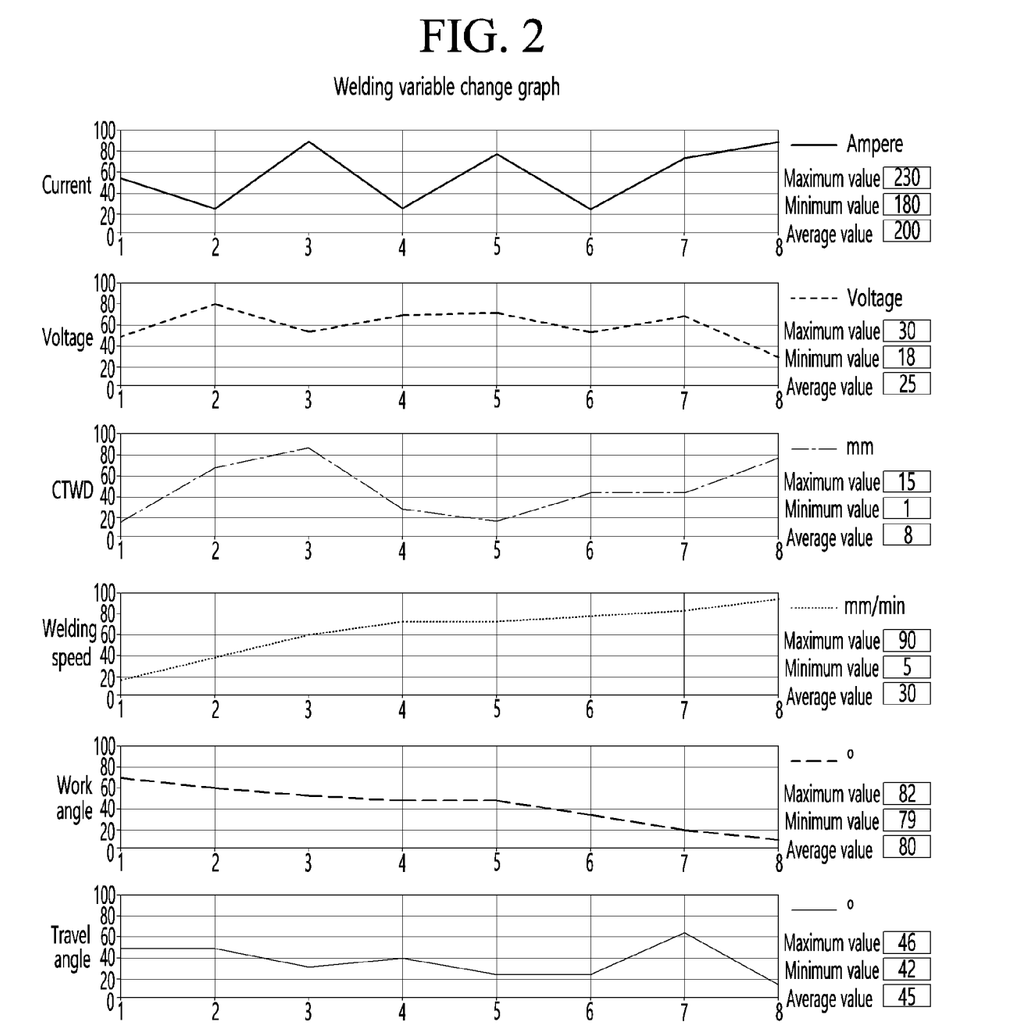
FIG. 2 is a diagram showing a process for collecting expert behavioral welding variables by a behavioral variable acquisition unit of the present embodiment.

FIG. 2 is a diagram showing a process for collecting expert behavioral welding variables by the behavioral variable acquisition unit of the present embodiment.

According to the present embodiment, the expert performs welding through a welding variable collection unit.

The welding variable collection unit in the present embodiment includes the behavioral variable acquisition unit 111, the mechanical variable acquisition unit 112, and the environmental variable acquisition unit 113.

The behavioral variable acquisition unit 111 includes an IMU sensor installed in a welding torch used by the expert, and the IMU sensor generates behavioral variable information by tracking a work angle and track angle of the torch when the expert performs welding.

In addition, the behavioral variable acquisition unit 111 includes the camera mounted on the welding helmet, and the behavioral variable acquisition unit 111 derives a welding speed and an arc length from an actual welding image captured through the camera by using an image processing algorithm.

Therefore, when the welding is performed, information of the work angle, travel angle, speed, and arc length is recorded through the behavioral variable acquisition unit 111, which is one of welding variable collection units. A recording period is numerically recorded in units of 0.1 seconds, and a trend of welding variables is visualized as a graph. When the welding has been completed, all the collected data are converted into a file by packetizing and stored.

In addition, the mechanical variable acquisition unit 112 includes a voltage sensor that measures a welding voltage when the welding is actually performed, a current sensor that measures a welding current, and a rotary sensor that measures a wire feeding speed.

In addition, the environmental variable acquisition unit 113 includes a temperature sensor that measures a temperature in the welding workplace, a humidity sensor that measures a humidity in the workplace, and a sensor that measures a wind direction and a wind speed.

The variables measured by respective sensors, that is, the work angle, the travel angle, the welding speed, the CTWD, the current, the voltage, the wire feeding speed, the temperature, the humidity, the wind direction, and the wind speed are stored as welding variable data.

In addition, such welding variable data is stored in the bigdata platform together with personal information (body, carrier, etc.) of the welder (expert) who generates the welding variable data, a welding environment (welding difficulty, shape of welding line, etc.), welding process information during welding, etc.

A beginner welder may perform welding by accessing the bigdata platform and retrieving bigdata based on the welding environment and the welding process information to retrieve the expert welding variable data under the same welding condition while referring to the retrieved expert welding variable data. That is, users may use the welding variable data by accessing the bigdata platform to retrieve the welding variable data (behavioral variables, mechanical variables, and environmental variables), which are the same as or most similar to that of desired welding of the users.

Figure 3:
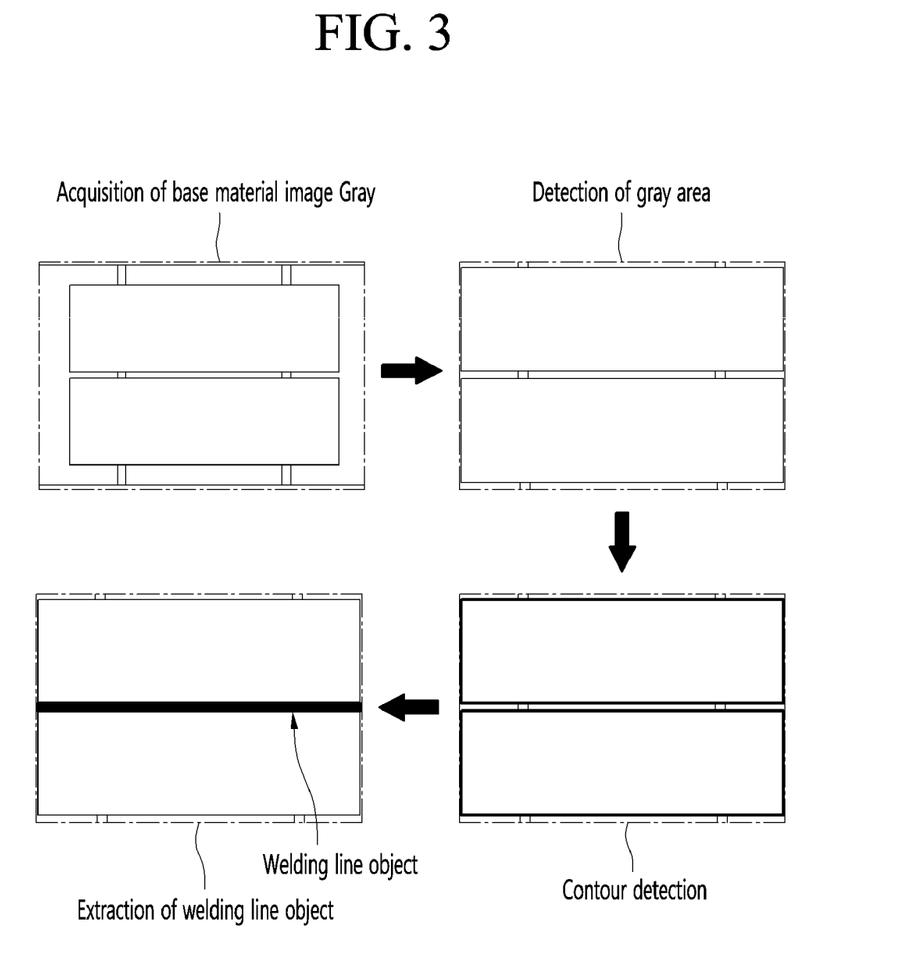
FIG. 3 is a view for explaining a process for extracting a welding line of a base material, which is a welding target, by a welding line extraction unit of the present embodiment.

FIG. 3 is a view for explaining a process for extracting a welding line of a base material, which is a welding target, by a welding line extraction unit of the present embodiment.

An image of the base material, which is a welding target, is acquired through the camera attached to the welding helmet. A gray area is derived from R, G, and B channels of the acquired image. A welding base material is formed of steel, aluminum, or stainless material and has a gray tone having no significant color difference between R, G, and B channels. Only the gray area is detected using the color feature points. A background of the image is removed, and a contour is detected from the detected gray area. The contour is detected in order to divide an upper plate and a lower plate of the base material, which is a welding target. When the upper plate and the lower plate have been divided, the upper plate and the lower plate are recognized as objects by applying a Blob labeling algorithm. Left and right end coordinates on a lower surface of the upper plate object and left and right end coordinates on an upper surface of the lower plate object are extracted to form a welding line object.

Through such a process, a welding line object can be extracted even if base materials with various shapes are used.

Figure 4:
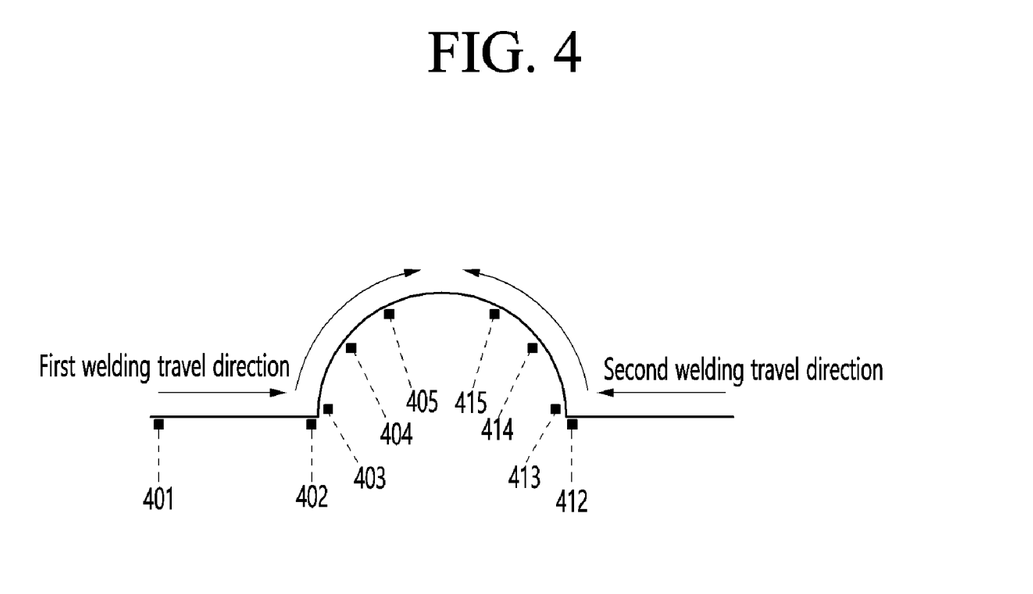
FIG. 4 is a view for explaining a process for arranging expert welding data about a welding line including flat sections and a curved section by a synchronization unit based on the data acquired through the behavioral variable acquisition unit and the welding line extraction unit.

FIG. 4 is a view for explaining a process for arranging expert welding data about a welding line including flat sections and a curved section by a synchronization unit based on the data acquired through the behavioral variable acquisition unit and the welding line extraction unit.

That is, FIG. 4 is a view showing a welding line having a curved section between flat sections, in which a trigger serving as a reference point is set for matching the welding variable data collected when the expert performs welding.

There is a need to provide welding variable data corresponding to a welding location and a welding timing such that the beginner can refer to the welding variable data, which is generated when the expert performs welding, when the beginner performs welding. To this end, the welding line is extracted using the camera when the beginner performs welding, and the reference point for the extracted welding line to synchronize the welding variable data is triggered. In this case, the welding variable data is generated when the expert welds the welding line having the curved section between the flat sections.

A trigger point is generated in order to provide expert behavior information in consideration of morphological characteristics of the extracted welding line. In the flat sections, the welding line has no change in welding variables. A trigger 401 is generated at a first starting section because it is most important to keep the sections constant. In addition, trigger points 402 and 403 are generated 5 mm before and after entering the curved section.

In addition, a trigger 404 is generated at a point of 45° from a midpoint of a half circle, and a trigger 405 is generated at a midpoint of the trigger 404 generated at a point of 45° from an uppermost end. The triggers generated are generated in this way when the welding is performed along a first welding travel direction, and triggers 412, 413, 414, and 415 are generated in the same manner as when the welding is performed on the opposite side (in a second welding travel direction).

Therefore, the triggers generated in this way are bilaterally symmetrical to each other. The expert variable data is substituted into the generated trigger point. Expert data collected under the same environment condition is arranged according to a time and a speed based on the welding line.

Figure 5:
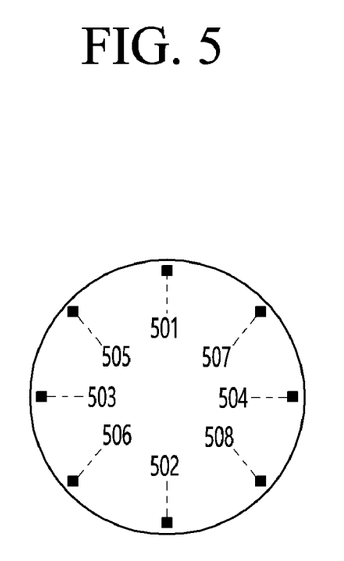
FIG. 5 is a view for explaining a process for arranging expert welding data about a circular welding line by a synchronization unit based on the data acquired through the behavioral variable acquisition unit and the welding line extraction unit.

FIG. 5 is a view for explaining a process for arranging expert welding data about a circular welding line by a synchronization unit based on the data acquired through the behavioral variable acquisition unit and the welding line extraction unit.

A trigger point is generated in order to provide expert behavior information in consideration of morphological characteristics of the extracted welding line. The circular welding line has triggers generated based on top 501, bottom 502, left 503, and right 504. Based on four triggers, four additional triggers 505, 506, 507, and 508 are generated at midpoints between the respective triggers. The circular welding line requires all welding postures such as a flat posture, a vertical/horizontal posture, and overhead posture, etc. In addition, when the posture is changed, an area of the midpoint is notified, thereby quickly providing support to easily correspond to the change. The expert variable data is substituted into the generated trigger point. Expert data collected under the same environment condition is arranged according to a time and a speed based on the welding line.

When a circular base material is welded, the flat/horizontal/overhead posture or the flat/vertical/overhead posture is applied according to a mounting angle of the circular base material. The welding travel direction is not specified because the welding is performed according to the preference of the welder. For this reason, it is preferable to generate triggers at points of the flat posture, overhead posture, and horizontal/vertical posture in order to arrange the triggers of the circular base material.

In addition, in order to generate additional triggers at locations where a posture of the welder is changed, it is sufficient to add the triggers 505, 506, 507, and 508 one by one between the top, bottom, left, and right triggers. This is because the beginner welder is confused when there are many changes in the triggers, so that when the welding variable data are shown based on too many triggers, the beginner welder is difficult to concentrate on the welding. That is, a trigger with a representative posture and a trigger, which is provided at a specific point (45°) where the posture of the welder is changed, are generated, thereby effectively providing information.

Figure 6:
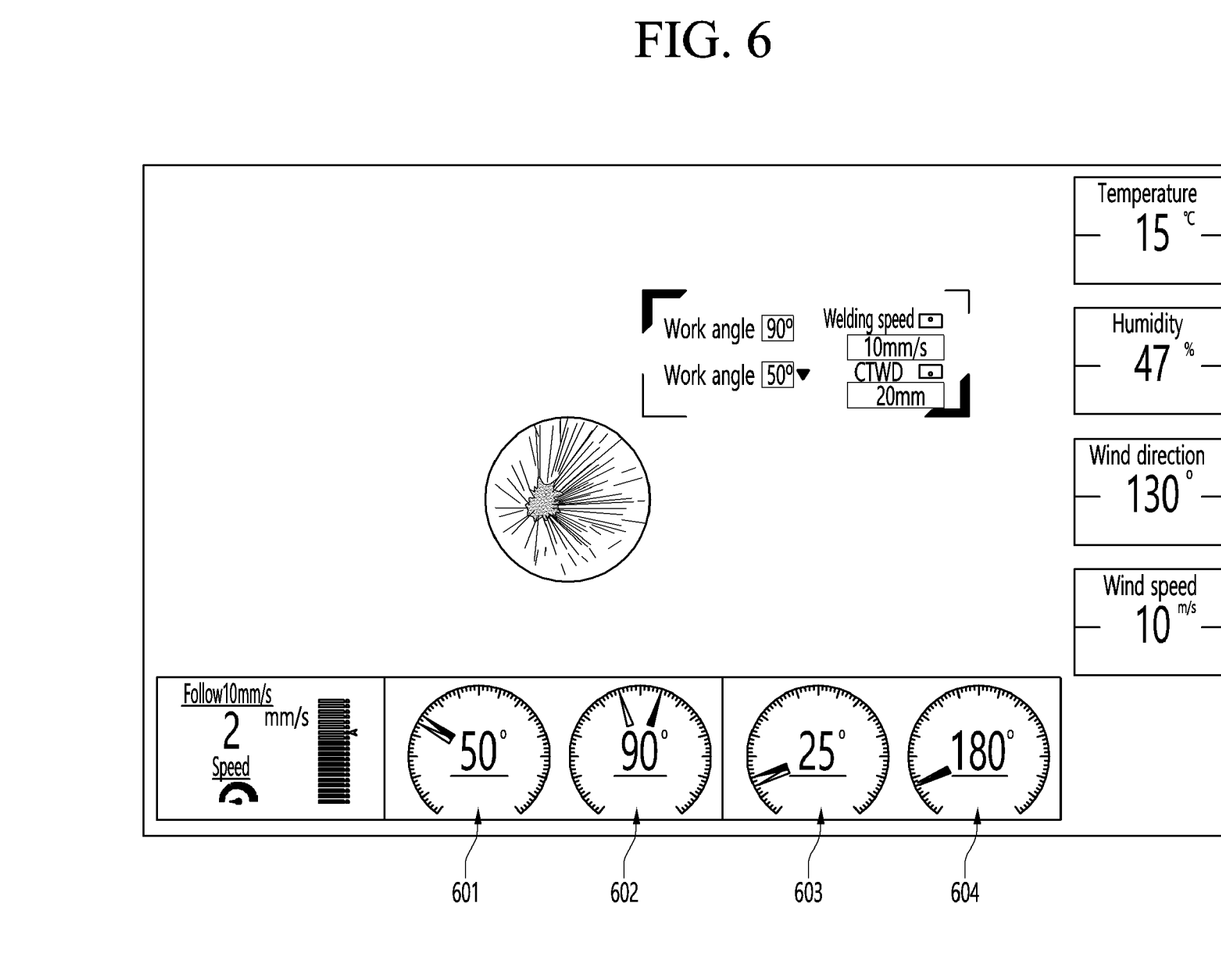
FIG. 6 is a view in which the welding variable data is visually displayed on an AR device based on a trigger through a navigation output unit of the present embodiment.

FIG. 6 is a view in which the welding variable data is visually displayed on an AR device based on a trigger through a navigation output unit of the present embodiment. When the welder performs welding, the expert welding variable data registered in the trigger are displayed on an AR device worn by the beginner welder.

A work angle 601, a travel angle 602, a voltage 603, and a current 604 are displayed on the AR device worn by a worker so that the worker can easily and visually check a bead width, a weaving interval, an unloading speed, and a travel direction for weaving that the worker is performing.

The work angle 601 and the travel angle 602 are indicated by arrows in the form of a compass based on Min-Max values. Arrows indicating the work angle and the travel angle of the expert, which are included in the welding variable data that the beginner can refer to, and arrows indicating the work angle and the travel angle of welding that the beginner is currently performing, are displayed separately from each other. For example, the work angle and the travel angle of the expert are indicated by hatched and shaded arrows, and the work angle and the travel angle of the beginner are indicated by unshaded or white arrows.

Similarly, the voltage value 603 and the current value 604 of the welding that has been performed by the expert, which serve as the welding variable data, are also indicated by arrows, and the voltage value and current value of current welding performed by the expert are indicated by arrows with different colors.

In addition, numerical information 611 about an expert work angle and travel angle is visualized on an upper right end of a point where welding light 610 captured by the camera is generated, and up and down icons are displayed next to the numerical value, thereby inducing adjustment of the work angle and travel angle of the trainee. In this case, data about the welding speed and the CTWD are represented numerically. The unit of the welding speed is mm/s, and the unit of the CTWD is mm. The expert data is represented numerically, and the up and down icons are displayed next to the numerical value, thereby inducing adjustment of the welding speed and the CTWD of the trainee.

In addition to the work angle, the travel angle, the welding speed, and the arc length, information about the voltage, current, temperature, humidity, wind direction, wind speed, etc., which are acquired through the welding variable collection unit, is provided to the welder.

According to the proposed embodiment of the present invention, when the welder performs welding, the welder can perform welding with reference to the behavioral welding variables collected while the expert performs welding, so that even if the welder has little experience, welding results with less defects can be easily produced. Accordingly, productivity and safety of the welding can be enhanced, and costs can be reduced.

What is claimed is:

1. An expert navigation device based on actual welding data, the expert navigation device comprising:
   a welding variable acquisition unit that acquires welding variable data of an expert through a bigdata platform;
   a welding line extraction unit that analyzes a base material, which is a welding target, through a camera mounted on a welding helmet to acquire the welding line in the base material;
   a synchronization unit that generates a trigger, which serves as a reference point, for matching the welding variable data acquired through the welding variable acquisition unit to the welding line acquired through the welding line extraction unit; and
   a navigation output unit that displays information of the welding variable data to a user when a welding location reaches a trigger point while welding is performed based on the trigger point generated by the synchronization unit,
   wherein the welding variable acquisition unit includes a mechanical variable acquisition unit including a temperature sensor that measures a temperature in a welding workplace when the expert performs welding, a humidity sensor that measures a humidity in the welding workplace, and a sensor that measures a wind direction and a wind speed.

2. The expert navigation device of claim 1, wherein the welding variable acquisition unit further includes a behavioral variable acquisition unit that acquires behavioral variables when the expert performs welding,
   in which the behavioral variable acquisition unit analyzes a work angle and a travel angle of a welding torch used by the expert when the expert performs welding by using an IMU sensor installed in the welding torch, and
   the behavioral variable acquisition unit analyzes a welding speed and an arc length from a welding image captured through the camera mounted on the welding helmet.

3. The expert navigation device of claim 1, wherein the mechanical variable acquisition unit further includes a voltage sensor that measures a welding voltage when the expert performs welding, a current sensor that measures a welding current, and a rotary sensor that measures a wire feeding speed.

4. The expert navigation device of claim 1, wherein the navigation output unit displays information of a work angle, a travel angle, a speed, and an arc length, which correspond to the welding variable data of the expert, through an AR device by imaging and digitalizing the information while a beginner performs welding.

* * * * *